(12) United States Patent
Nielsen (10) Patent No.: US 7,849,686 B2
(45) Date of Patent: Dec. 14, 2010

(54) VALVE ASSEMBLY AND A HYDRAULIC ACTUATOR COMPRISING THE VALVE ASSEMBLY

(75) Inventor: Brian Nielsen, Viborg (DK)

(73) Assignee: Sauer-Danfoss ApS, Nordborg (DK)

( * ) Notice: Subject to any disclaimer, the term of this patent is extended or adjusted under 35 U.S.C. 154(b) by 154 days.

(21) Appl. No.: 11/703,430

(22) Filed: Feb. 7, 2007

(65) Prior Publication Data
US 2008/0184875 A1    Aug. 7, 2008

(51) Int. Cl.
F16D 31/02    (2006.01)
(52) U.S. Cl. .............................. 60/403; 60/443; 91/454
(58) Field of Classification Search .................. 91/454; 60/403, 443, 444
See application file for complete search history.

(56) References Cited

U.S. PATENT DOCUMENTS

| | | | |
|---|---|---|---|
| 2,569,881 A * | 10/1951 | Davies | 91/454 |
| 3,559,536 A * | 2/1971 | Mason | 91/454 |
| 4,282,711 A * | 8/1981 | Branstetter | 60/444 |
| 4,416,187 A | 11/1983 | Nystrom | 91/361 |
| 4,640,095 A | 2/1987 | Engel et al. | |
| 4,870,892 A | 10/1989 | Thomsen et al. | 91/361 |
| 5,165,320 A | 11/1992 | Ravn | |
| 5,202,822 A | 4/1993 | McLaughlin et al. | |

(Continued)

FOREIGN PATENT DOCUMENTS

DE    92 11 109.2 U1    10/1992

| | | |
|---|---|---|
| DE | 4312757 A1 | 10/1994 |
| DE | 4431103 | 3/1996 |
| DE | 102005013823 A1 | 11/2005 |

(Continued)

OTHER PUBLICATIONS

Co-pending U.S. Appl. No. 11/703,575 entitled "A Control System for a Hydraulic Servomotor" filed Feb. 7, 2007.

(Continued)

*Primary Examiner*—F. Daniel Lopez
(74) *Attorney, Agent, or Firm*—McCormick, Paulding & Huber LLP (57) ABSTRACT

A valve assembly (2) forming a bridge circuit and a hydraulic actuator comprising at least one valve assembly (2) are disclosed. The valve assembly (2) is fluidly connectable between a fluid source (3) and a fluid drain (4). The valve assembly (2) comprises a first valve (8) fluidly connected between the fluid source (3) and a first diagonal point (12) of the bridge circuit, a second valve (9) fluidly connected between the fluid source (3) and a second diagonal point (13) of the bridge circuit, a third valve (10) fluidly connected between the first diagonal point (12) and the fluid drain (4), and a fourth valve (11) fluidly connected between the second diagonal point (13) and the fluid drain (4). The valves (8, 9, 10, 11) are such that in the case of a power cut off, flows of fluid away from the diagonal points (12, 13) are prevented. Thereby a hydraulic servomotor (5) connected across the diagonal points (12, 13) will be hydraulically locked in its instantaneous position, and a safety feature is accordingly provided. The first valve (8) and the second valve (9) are furthermore of a kind which is closed in an energized state. Thereby it is possible to control the valve assembly (2) in such a manner that a piston member (14) of a servomotor (5) connected across the diagonal points (12, 13) can be moved at a high velocity, thereby providing a servomotor (5) having a quick response time.

13 Claims, 6 Drawing Sheets

U.S. PATENT DOCUMENTS

| | | |
|---|---|---|
| 5,299,420 A | 4/1994 | Devier et al. |
| 5,353,685 A | 10/1994 | Snow |
| 5,489,005 A | 2/1996 | Marcott et al. |
| 5,519,636 A | 5/1996 | Stoll et al. |
| 5,743,165 A | 4/1998 | Tanaka et al. |
| 5,868,059 A | 2/1999 | Smith |
| 5,960,695 A | 10/1999 | Aardema et al. |
| 6,131,391 A | 10/2000 | Poorman |
| 6,626,082 B2 | 9/2003 | Morita et al. |
| 6,637,199 B2 * | 10/2003 | Spickard ............ 60/403 |
| 6,662,556 B2 | 12/2003 | Bares et al. |
| 6,748,738 B2 * | 6/2004 | Smith ................ 91/454 |
| 7,380,398 B2 | 6/2008 | Pfaff |
| 2004/0196003 A1 | 10/2004 | Graff et al. |
| 2006/0136101 A1 | 6/2006 | Spengler |

FOREIGN PATENT DOCUMENTS

| | | |
|---|---|---|
| EP | 1 403 129 A2 | 3/2004 |
| EP | 1700728 A2 | 9/2006 |
| WO | 96/07029 A1 | 3/1996 |
| WO | 2005077731 A1 | 8/2005 |
| WO | 2005078318 A1 | 8/2005 |
| WO | 2006/102906 A2 | 10/2006 |

OTHER PUBLICATIONS

Co-pending U.S. Appl. No. 11/703,431 entitled "A Hydraulic Actuator Having an Auxiliary Valve" filed Feb. 7, 2007.

Co-pending U.S. Appl. No. 11/703,314 entitled "A Hydraulic Actuator for a Servomotor With an End Lock Function" filed Feb. 7, 2007.

* cited by examiner

VALVE ASSEMBLY AND A HYDRAULIC ACTUATOR COMPRISING THE VALVE ASSEMBLY

CROSS REFERENCE TO RELATED APPLICATIONS

This application discloses similar subject matter as disclosed in co-pending application Ser. No. 11/703,575 entitled "A Control System For A Hydraulic Servomotor"; co-pending application Ser. No. 11/703,431 entitled "A Hydraulic Actuator Having An Auxiliary Valve"; and co-pending application Ser. No. 11/703,314 entitled "A Hydraulic Actuator For A Servomotor With an End Lock Function" all assigned to the same Assignee and filed on the same date herewith.

FIELD OF THE INVENTION

The present invention relates to a valve assembly, in particular for use in a hydraulic actuator. More particularly, the valve assembly of the invention allows a hydraulic actuator comprising the valve assembly to lock a hydraulic servomotor in its instantaneous position in the case of a power loss or actuator failure.

BACKGROUND OF THE INVENTION

Some prior art hydraulic actuators, such as the actuators disclosed in WO 96/07029 or U.S. Pat. No. 4,870,892 provide safety measures in the case of electrical power cut off or actuator failure. In the actuators disclosed in WO 96/07029 and U.S. Pat. No. 4,870,892 this is obtained by causing the sliding member to move to a neutral position in the case of power cut off or actuator failure. In the actuator disclosed in U.S. Pat. No. 4,870,892 this is obtained by positioning the sliding member in the diagonal of a bridge circuit. Two valves which are normally closed in a de-energized state are fluidly connected between a pump and two pressure chambers of the sliding member, and two valves which are normally open in a de-energized state are fluidly connected between the pressure chambers and a tank. Furthermore, two biasing springs are arranged in the sliding member, biasing the sliding member towards the neutral position. Thus, in the case of an electrical power cut off the two valves arranged on the pump side are closed and the two valves on the tank side are opened. In the absence of fluid pressure from the pump, due to the closed valves on the pump side, the biasing springs will push the sliding member towards the neutral position, and fluid is allowed to flow between the tank and the pressure chambers, due to the open valves on the tank side. Accordingly, the sliding member is moved into the neutral position.

In the actuator disclosed in WO 96/07029 a sliding member is also positioned in the diagonal of a bridge circuit. However, in this case all four valves are of the normally open type. Thus, in the case of a power cut off, all four valves are opened. Thereby there is a permanent flow of fluid from the pressure source (pump) to the pressure sink (tank). Since this flow of fluid is distributed uniformly over the two branches of the bridge circuit, the pressure on each side of the sliding member is the same. Thereby the sliding member will be moved to a neutral position.

However, in some hydraulic position motors, such as those incorporated in hydro-mechanical transmissions (HMT's) on all terrain vehicles or work utility vehicles, there is a need for locking a hydraulic servomotor in its instantaneous position, if a failure is detected or loss of power happens. For example, the driver must, for safety reasons, not be exerted to potential hazardous accelerations and decelerations, and the gearing ratio of the HMT must therefore be maintained in the case of a power loss or actuator failure. With regard to the hydraulic servomotor, this means that it should be locked in its instantaneous position. In such applications it is therefore not necessarily appropriate that the hydraulic servomotor must move to a neutral position as described in WO 96/07029 and U.S. Pat. No. 4,870,892.

U.S. Pat. No. 4,416,187 discloses an actuator configuration based on switching valves where an instantaneous locking of a sliding member is possible. In the actuator disclosed in U.S. Pat. No. 4,416,187 a sliding member is positioned in the diagonal of a bridge circuit of valves. Two check valves are fluidly connected between a pump and two pressure chambers of the sliding member, the check valves being arranged in such a manner that a fluid flow is prevented in a direction from the pressure chambers towards the pump. Furthermore, two valves of the normally closed type are fluidly connected between the pressure chambers and a tank. Thus, in the case of a power cut off the two valves of the normally closed type are closed. Thereby fluid is not allowed to flow out of the pressure chambers, and the sliding member is thereby locked in its instantaneous position.

It is a disadvantage of the actuator configuration of U.S. Pat. No. 4,416,187 that both of the check valves always allow a fluid flow in a direction from the pump towards the pressure chambers. This has the consequence that, during normal operation of the actuator, the obtainable velocity of the sliding member is limited, and thereby movement of the sliding member from one operational position to another can only occur at a limited speed, and the operability of the actuator is thereby inhibited.

SUMMARY OF THE INVENTION

It is, thus, an object of the invention to provide a hydraulic actuator in which instantaneous locking of a hydraulic servomotor is possible in the case that power is cut off or actuator failure is detected, without affecting the operability of the actuator during normal operation.

It is a further object of the invention to provide a valve assembly adapted to control fluid flow in a hydraulic actuator in such a manner that instantaneous locking of a hydraulic servomotor is possible in the case that power is cut off or actuator failure is detected, without affecting the operability of the actuator during normal operation.

According to a first aspect of the invention the above and other objects are fulfilled by providing a valve assembly forming a bridge circuit and being fluidly connectable between a fluid source and a fluid drain, the valve assembly comprising:

at least one first valve fluidly connected between the fluid source and a first diagonal point of the bridge circuit, said at least one first valve being a valve which is normally open in a de-energized state, at least in a direction from the fluid source towards the first diagonal point, at least one second valve fluidly connected between the fluid source and a second diagonal point of the bridge circuit, said at least one second valve being a valve which is normally open in a de-energized state, at least in a direction from the fluid source towards the second diagonal point, at least one third valve fluidly connected between the first diagonal point of the bridge circuit and the fluid drain, said at least one third valve being a valve which is normally closed in a de-energized state, and at least one fourth valve fluidly connected between the second diagonal point of the bridge circuit and the fluid drain, said at least one fourth valve being a valve which is normally closed in a de-energized state.

The fluid source may advantageously be or comprise a pump, and the fluid drain may advantageously be or comprise a tank.

The first and second valves are both of a kind which is normally open in a de-energized state, at least in a direction from the fluid source towards the first/second diagonal point. The first and second valves may be of a kind which is closed in an energized state and which is open in a de-energized state. Alternatively, the valves may be of a kind which, in a de-energized state, function as a check valve arranged in such a manner that a fluid flow in a direction from the fluid source towards the respective diagonal point is allowed, while a fluid flow in a reverse direction is prevented. Thus, during normal operation it is possible to close the first valve and/or the second valve, and thereby a given flow capacity of the fluid source may be supplied purely to one of the diagonal points, rather than to both of them. Thereby a more precise and quick operation of the valve assembly is obtained, as compared to similar prior art valve assemblies.

The third and fourth valves are of the kind which is normally closed in a de-energized state. Accordingly, in the case of a power cut off, these valves are closed, thereby preventing fluid flow from the diagonal points towards the fluid drain. In the case that the first and second valves function as check valves as described above a fluid flow away from the diagonal points will be prevented.

At least one of the valves may be an electrically operable valve, such as a solenoid valve. Alternatively, the valves may be of any other suitable kind. All of the valves are preferably of the kind which is electrically operated.

The valve assembly may further comprise a hydraulic servomotor comprising a first chamber arranged fluidly connected to the first diagonal point of the bridge circuit and a second chamber arranged fluidly connected to the second diagonal point of the bridge circuit. According to this embodiment, fluid flows out of the chambers are prevented in the case of a power cut off, since fluid flows away from the diagonal points are prevented as described above. As a consequence, the hydraulic servomotor will be immediately locked in its instantaneous position.

It should be noted that in the present context the term 'locked' should be interpreted to mean hydraulically locked or held, rather than mechanically locked.

Thus, the valve assembly provides a safety feature in the case of a power cut off, and this safety feature is obtained without adversely affecting the normal operation of the valve assembly, including the operating velocity of the hydraulic servomotor. This is very advantageous.

The hydraulic servomotor may be of a linear kind, e.g. comprising a sliding member with a piston slidingly arranged in a cylinder, the piston dividing the cylinder into the first and second chambers. As an alternative, the hydraulic servomotor may be of a rotational kind comprising one or more angularly movable members being displaceable in response to a supply of fluid to the first and second chambers. As another alternative, it may be of a kind comprising two linearly moving pistons, e.g. with a pressure chamber at one end of each piston and attached to a swash plate rotating about a trunnion.

The valves of the valve assembly may be controlled by means of a closed loop control of the hydraulic servomotor. The closed loop control may, e.g., be based on position of the servomotor, e.g. linear position or angular position, pressure in the chambers and/or on any other suitable parameter.

Thus, the valve assembly may further comprise at least one sensor, said sensor(s) being adapted to provide an input signal to the closed loop control. Suitable sensors may, e.g., be position sensors, such as linear variable displacement transducers (LVDT), pressure sensors, temperature sensors, flow sensors, etc.

The valve assembly may further comprise at least one additional hydraulic servomotor fluidly connected between the first diagonal point of the bridge circuit and the second diagonal point of the bridge circuit. The hydraulic servomotors are preferably mechanically linked. According to this embodiment, two or more servomotors may be applied in order to obtain a desired level of output force from the system, replacing one larger servomotor providing the same level of output force. Using the smaller servomotors provides a more flexible system in the sense that the smaller servomotors may be easier fitted into the desired application than one larger servomotor.

At least one valve of the valve assembly may be driven by a pulse train signal. All of the valves may be driven by one or more pulse train signals, or some of the valves may be driven by one or more pulse train signals, while other valves are not. Alternatively, all of the valves may be driven in any other suitable manner.

According to a second aspect of the invention the above and other objects are fulfilled by providing a hydraulic actuator comprising at least one valve assembly according to the first aspect of the invention.

It should be noted that a skilled person would readily recognise that any feature described in combination with the first aspect of the invention could equally be combined with the second aspect of the invention, and vice versa.

In the present context the term 'hydraulic actuator' should be interpreted to mean an actuator which is adapted to drive a hydraulic application, e.g. a hydraulic servomotor.

The hydraulic actuator may comprise at least two valve assemblies according to the first aspect of the invention. In this case the valve assemblies may be arranged in a modular configuration and/or they may be arranged in such a manner that redundant control of a hydraulic servomotor driven by the actuator is obtained. This is very advantageous, because a reliable operation of the hydraulic actuator, and thereby of the hydraulic servomotor, is thereby obtained, even if a failure occurs in one of the valve assemblies, e.g. if one or more valves get stuck.

The valve assembly and/or the hydraulic actuator according to the present invention may suitably be used in a hydromechanical transmission (HMT), e.g. for an all terrain vehicle or a work utility vehicle, or in an electro hydraulic steering application, or in any other suitable application.

The hydraulic actuator may comprise a main control module adapted to supply control signals to at least some of the valves, thereby controlling fluid flows in the actuator. The main control module may comprise one or more connectors, e.g. comprising connector pins, for receiving and/or transmitting signals, such as control signals, sensor signals, electric signals, optic signals, magnetic signals, etc. The actuator may further comprise or be connected to at least one extension control module comprising one or more connectors for receiving and/or transmitting signals. In this case the main control module and the extension control module(s) are preferably adapted to communicate signals to/from each other. Thereby it is possible to provide additional connectors for communicating signals to/from the actuator. Thereby it is possible to provide additional connectors for communicating with the main control module, and it may thereby be possible to allow for additional functionalities of the control module.

Accordingly, a more 'intelligent' control system for the actuator can be provided, and the need for an external controller may even be avoided.

BRIEF DESCRIPTION OF THE DRAWINGS

The invention will now be described in further detail with reference to the accompanying drawings in which.

DETAILED DESCRIPTION OF THE INVENTION

Figure 1:
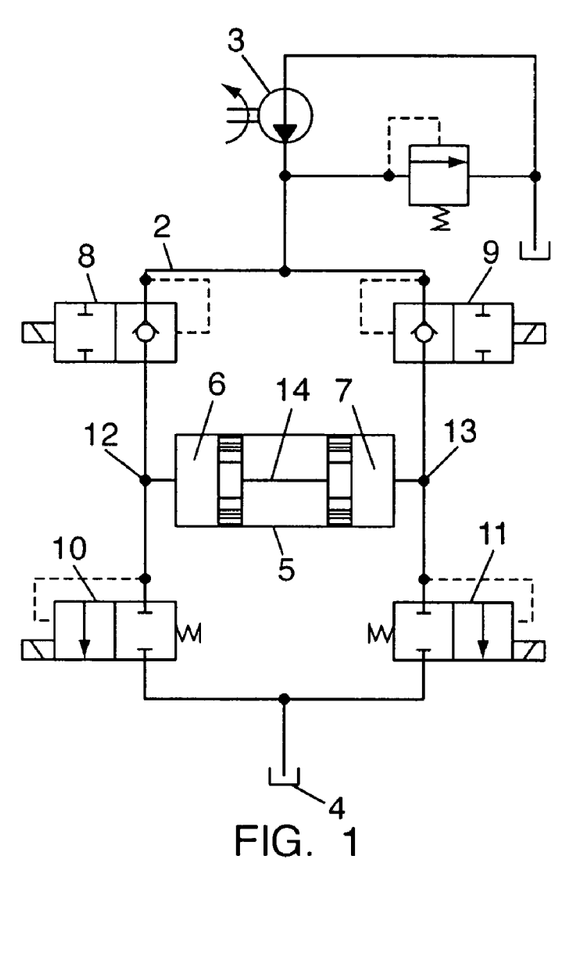
FIGS. 1-7 are schematic diagrams illustrating various embodiments of hydraulic actuators according to the invention, and comprising one or more valve arrangements according to the invention.

FIG. 1 is a schematic diagram illustrating a hydraulic actuator comprising a valve arrangement 2. The hydraulic actuator is connected between a fluid source in the form of a pump 3 and a fluid drain in the form of a tank 4, and it is further connected to a servomotor 5, the servomotor 5 defining a first chamber 6 and a second chamber 7.

The valve arrangement 2 comprises four valves 8, 9, 10, 11 forming a bridge circuit, and the first chamber 6 is fluidly connected to the bridge circuit at a first diagonal point 12, and the second chamber 7 is fluidly connected to the bridge circuit at a second diagonal point 13. Thus, the servomotor 5 is connected across the diagonal points 12, 13 of the bridge circuit.

A first valve 8 is fluidly connected between the pump 3 and the first chamber 6. The first valve 8 is a solenoid valve which is closed in an energized state. In a de-energized state the first valve 8 functions as a check valve arranged in such a manner that a flow of fluid in a direction from the pump 3 towards the first chamber 6 is allowed, while a flow of fluid in a direction from the first chamber 6 towards the pump 3 is not allowed.

A second valve 9 is fluidly connected between the pump 3 and the second chamber 7. The second valve 9 is also a solenoid valve which is closed in an energized state. In a de-energized state the second valve 9 functions as a check valve arranged in such a manner that a flow of fluid in a direction from the pump 3 towards the second chamber 7 is allowed, while a flow of fluid in a direction from the second chamber 7 towards the pump 3 is not allowed.

It should be noted, that the first valve 8 and/or the second valve 9 could alternatively be replaced by a valve which is open in a de-energized state and closed in an energized state, fluidly arranged in series with a check valve arranged as described above. Such an arrangement would function in the same manner.

A third valve 10 is fluidly connected between the first chamber 6 and the tank 4. The third valve 10 is a solenoid valve which is closed in a de-energized state and open in an energized state. A fourth valve 11 is fluidly connected between the second chamber 7 and the tank 4. The fourth valve 11 is also a solenoid valve which is closed in a de-energized state and open in an energized state.

In the case of a power cut off the third valve 10 and the fourth valve 11 will close, thereby preventing flows of fluid from the chambers 6, 7 towards the tank 4. The first valve 8 and the second valve 9 will function as check valves as described above, thereby preventing fluid flows from the chambers 6, 7 towards the pump 3. Accordingly, it is not possible for fluid to leave the chambers 6, 7 under these circumstances, and servomotor piston member 14 is therefore immediately locked in its instantaneous position. Thereby the servomotor 5 is also locked in its instantaneous position.

However, during normal operation it is possible to energize the first valve 8 and/or the second valve 9, thereby closing the selected valve(s) 8, 9. When one of the valves 8, 9 is closed, the flow capacity of the pump 3 is used for providing fluid via the other of the valves 9, 8. Accordingly, it is possible to provide a relatively large flow capacity through the valve 9, 8 which is not closed, i.e. to the first chamber 6 or to the second chamber 7 if desired. Thereby it is possible to move the servomotor piston member 14 at a high velocity, and a quick response time of the servomotor 5 is thereby obtained.

Figure 2:
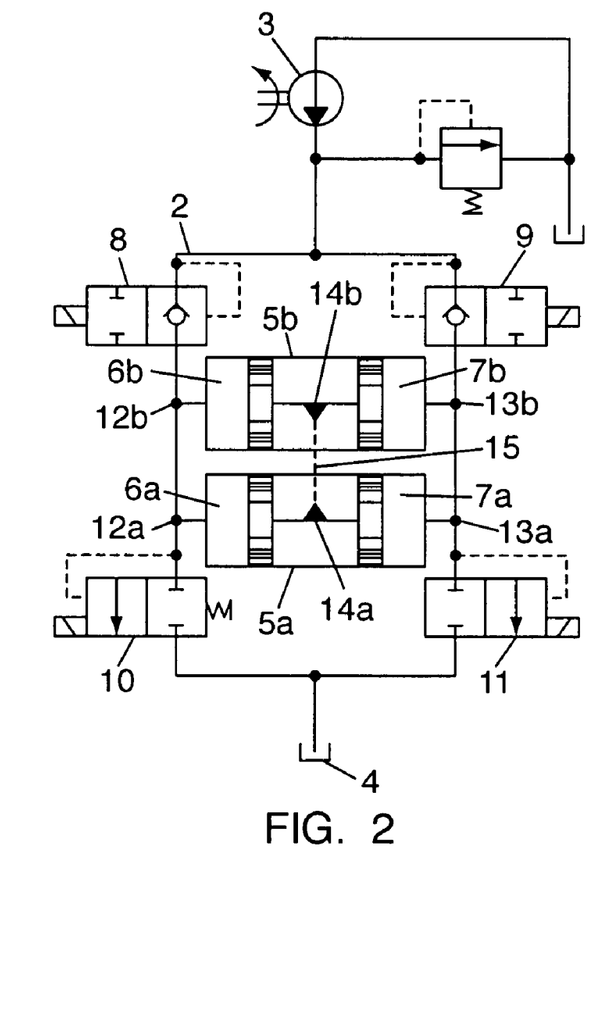

FIG. 2 is a schematic diagram of a hydraulic actuator according to a second embodiment of the invention. The embodiment shown in FIG. 2 is very similar to the embodiment shown in FIG. 1, and parts which have already been described above will therefore not be described in detail here.

In the hydraulic actuator of FIG. 2 two servomotors 5a, 5b, each defining a first chamber 6a, 6b and a second chamber 7a, 7b, are connected across diagonal points 12, 13 of the bridge circuit. The servomotor piston members 14a, 14b of the servomotors 5a, 5b are mechanically linked by means of connecting member 15. Such an arrangement may be used for providing balancing of forces in the system. Furthermore, the two hydraulic servomotors 5a, 5b may replace one larger servomotor providing the same output force level as the combined output force level of the two hydraulic servomotors 5a, 5b, thereby providing a system which may more easily be fitted into a desired application.

The locking feature described above with reference to FIG. 1 is also provided by the hydraulic actuator of FIG. 2. However, in this case both of the servomotors 5a, 5b will be locked in their instantaneous position.

Figure 3:
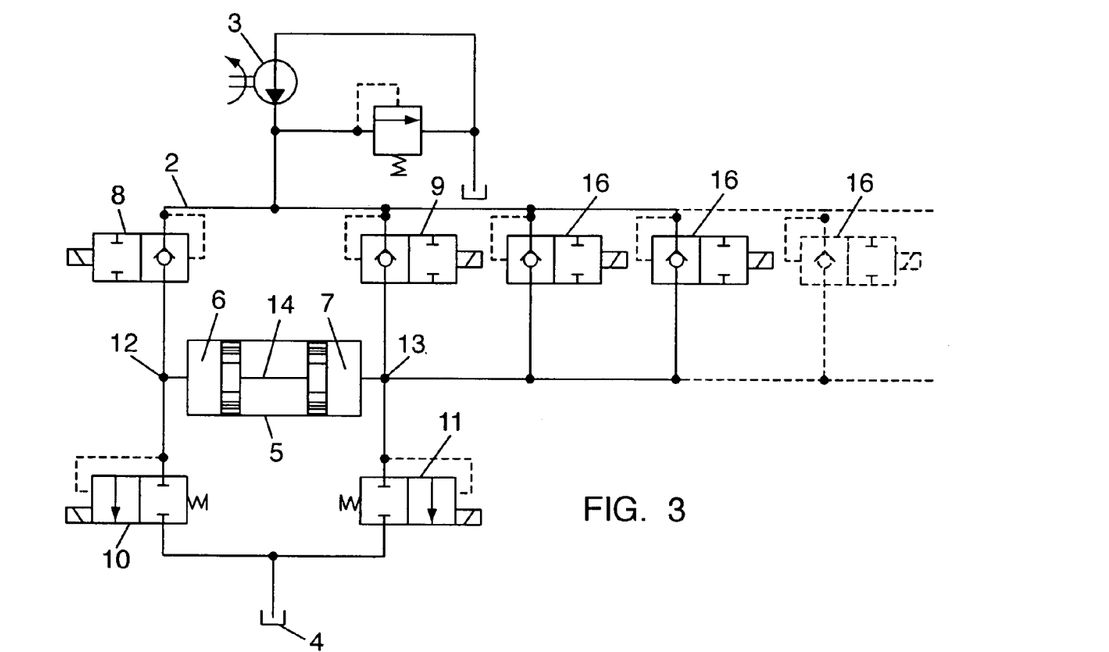

FIG. 3 is a schematic diagram of a hydraulic actuator according to a third embodiment of the invention. The embodiment shown in FIG. 3 is very similar to the embodiment shown in FIG. 1, and parts which have already been described above will therefore not be described in detail here.

The hydraulic actuator of FIG. 3 further comprises a number of additional valves 16 arranged in parallel with the second valve 9 of the bridge circuit. The dotted line indicates that even further additional valves 16 may be added. This provides the possibility of adapting the flow capacity of the hydraulic actuator to a desired level.

The additional valves 16 are all of the kind which is closed in an energized state. In a de-energized state the additional 16 valves function as check valves, and they are arranged in such a manner that a flow of fluid is allowed in a direction from the pump 3 towards the second chamber 7, while a flow of fluid is prevented in a direction from the second chamber 7 towards the pump 3. Thus, in the case of a power cut off the hydraulic actuator of FIG. 3 will function as the hydraulic actuator of FIG. 1, and the locking function described above with reference to FIG. 1 is therefore also provided by the hydraulic actuator of FIG. 3, without adversely affecting the normal operation of the hydraulic actuator, including the obtainable operating velocity of the servomotor 5.

It should be noted that additional valves 16 could alternatively or additionally be arranged in parallel with one or more of the other valves 8, 10, 11 of the bridge circuit in order to obtain a similar result. It should also be noted that it would also be possible to adapt the flow capacity of the system by replacing the second valve 9 and the additional valves 16 by one valve having a desired (larger) flow capacity. It should be understood that additional valves 16 should be of the same kind as the valve which they are arranged in parallel to. Thus, in the case that additional valves 16 are arranged in parallel with the first valve 8, they should be of the kind which is closed in an energized state and functions as a check valve in a de-energized state. In the case that additional valves 16 are arranged in parallel with the third valve 10 or the fourth valve 11, they should be of a kind which is closed in a de-energized state and open in an energized state.

Figure 4:
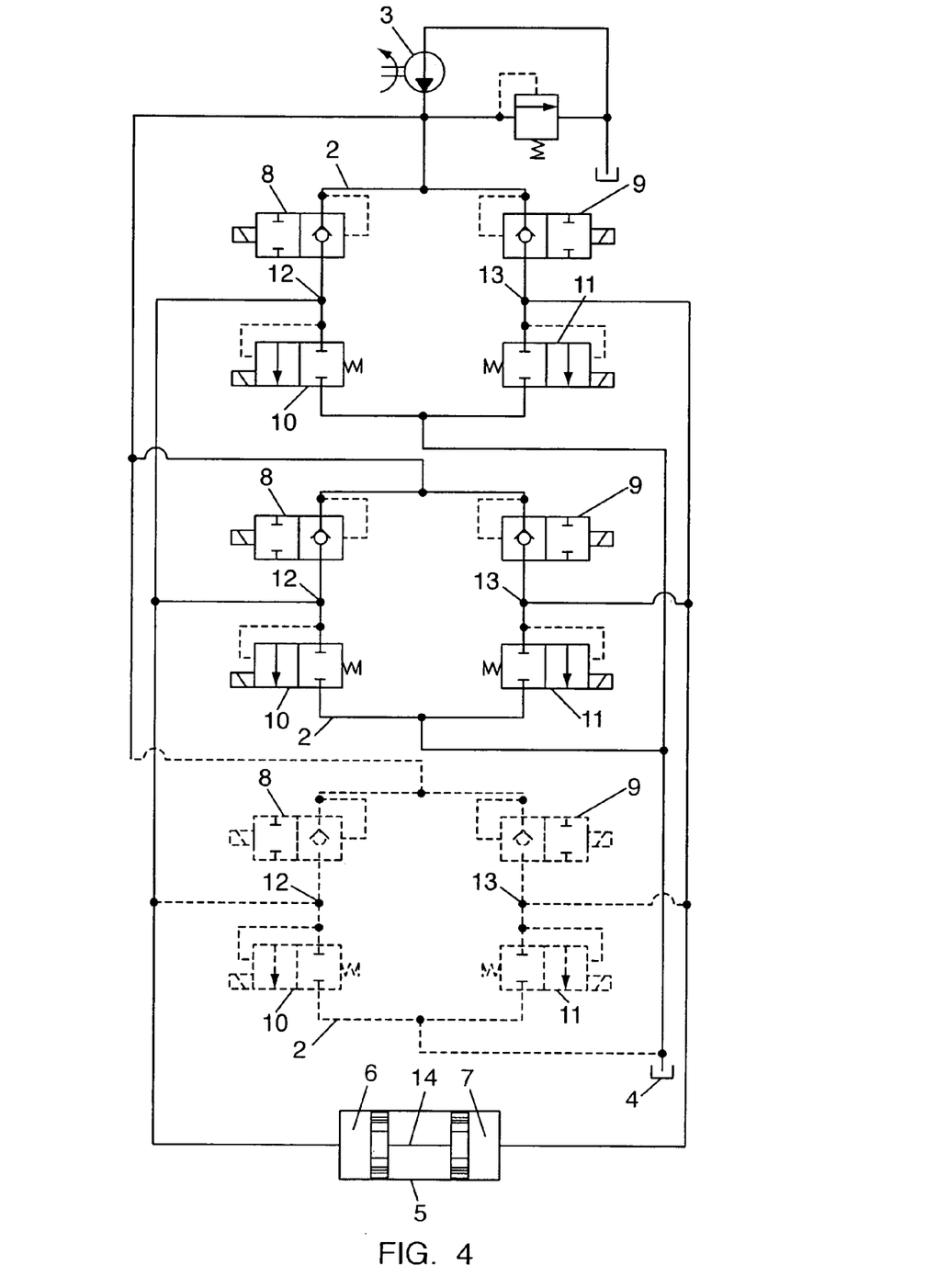

FIG. 4 is a schematic diagram of a hydraulic actuator according to a fourth embodiment of the invention. The hydraulic actuator of FIG. 4 comprises a number of valve assemblies 2 identical to the valve assembly 2 of FIG. 1. The valve assemblies 2 are fluidly connected in parallel to the hydraulic servomotor 5 in such a manner that they are all adapted to control fluid flows to/from the chambers 6, 7 as described above with reference to FIG. 1, and the servomotor 5 is connected across diagonal points 12, 13 of each of the valve assemblies 2. Thereby the valve assemblies 2 may provide redundancy of the electro hydraulic actuator in the sense that if one of the valve assemblies 2 fails, e.g. because one or more valves fail, the remaining valve assemblies 2 will continue to operate, thereby ensuring operation of the hydraulic servomotor 5.

The dotted line indicates that even further valve assemblies 2 may be added in order to obtain a desired flow capacity.

Figure 5:
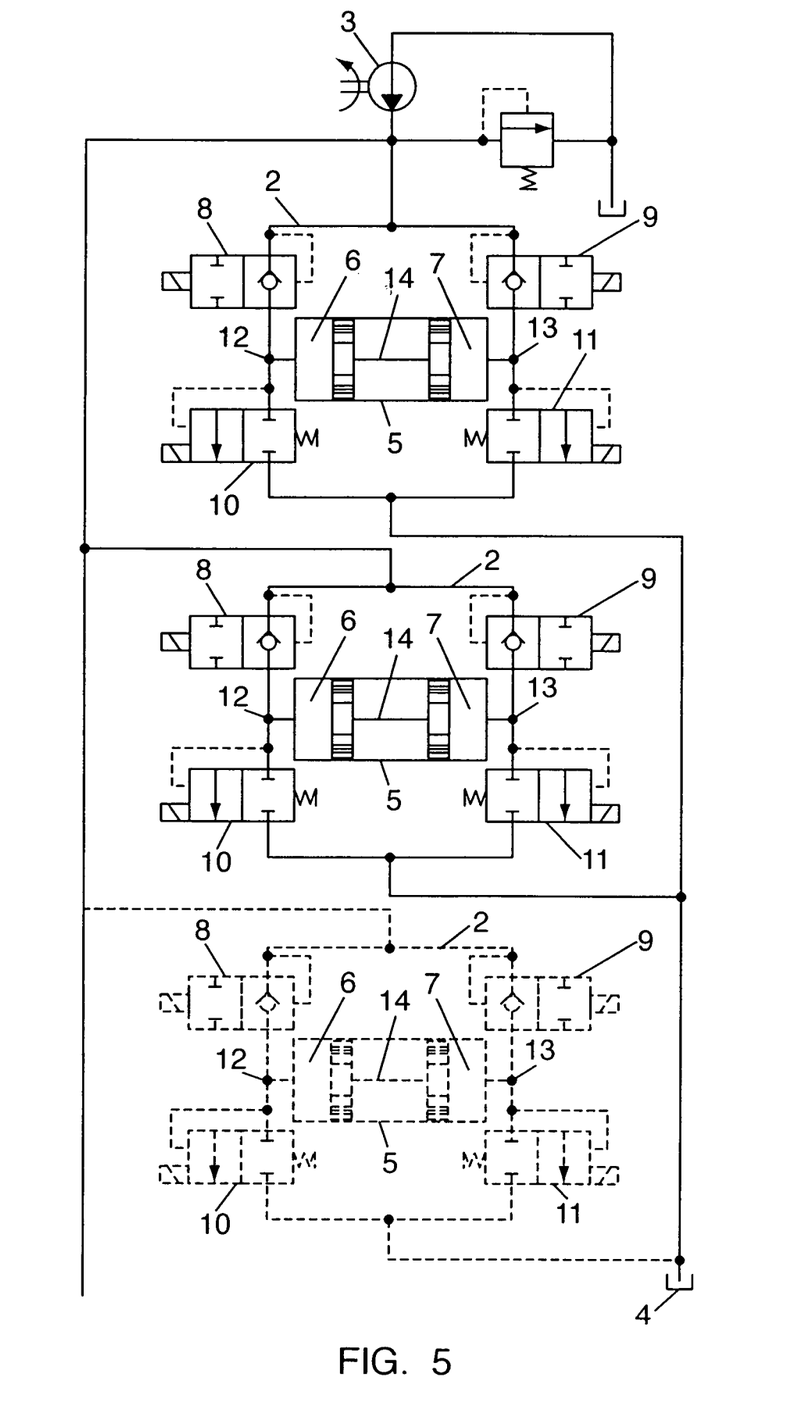

FIG. 5 is a schematic diagram of a hydraulic actuator according to a fifth embodiment of the invention. The hydraulic actuator of FIG. 5 is composed of a number of hydraulic actuators identical to the one illustrated in FIG. 1. The actuators are arranged in parallel. This configuration provides redundancy of the system in the case that a failure occurs on one of the servomotors 5, and in the case that all of the servomotors 5 are hydraulically coupled to the same application, e.g. the servomotors 5 being spools of hydraulic spool valves which are coupled to one common cylinder. As an alternative, the hydraulic servomotors 5 may each be coupled to an individual cylinder, each cylinder performing an individual task.

In the embodiments shown in FIGS. 4 and 5 the valve assemblies 2 are arranged in a modular configuration. Thus, the valve assemblies 2 may each be regarded as a module, and a desired number of modules may be applied in order to obtain a desired configuration of the hydraulic actuator, e.g. in the sense of flow capacity, redundancy, etc.

Figure 6:
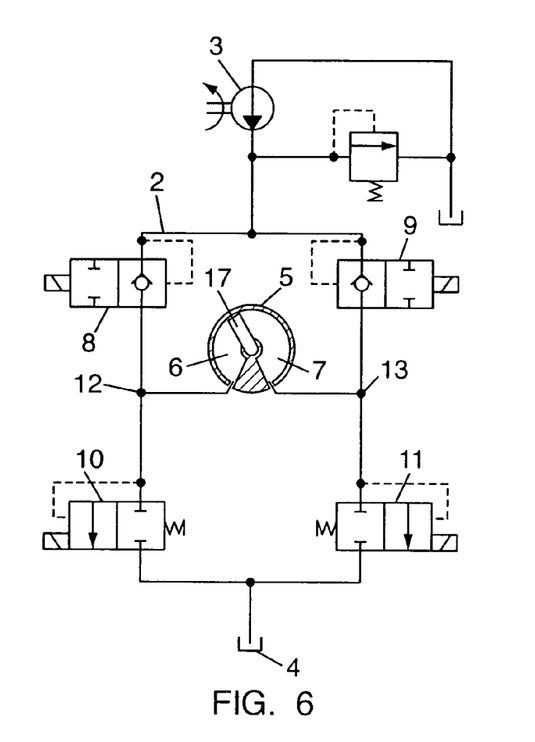

FIG. 6 is a schematic diagram of a hydraulic actuator according to a sixth embodiment of the invention. The hydraulic actuator of FIG. 6 is very similar to the hydraulic actuator of FIG. 1, and parts which have already been described above will therefore not be described in detail here.

The difference between the hydraulic actuator of FIG. 1 and the hydraulic actuator of FIG. 6 is that the servomotor 5 shown in FIG. 6 is of a rotatable kind. The servomotor 5 comprises a first chamber 6 and a second chamber 7, the chambers 6, 7 being fluidly connected to the valves 8, 9, 10, 11 as described above. However, in this case the chambers 6, 7 are divided by a rotating member 17. Thus, opening and closing the valves 8, 9, 10, 11 in an appropriate manner will, in this case, result in a desired fluid flow to/from the chambers 6, 7, and thereby a desired angular position of the rotating member 17 is obtained.

In the case of a power cut off, the third valve 10 and the fourth valve 11 will close, thereby preventing flows of fluid from the chambers 6, 7 towards the tank 4, as described above. Furthermore, the first valve 8 and the second valve 9 will function as check valves, thereby preventing fluid flows from the chambers 6, 7 towards the pump 3, as described above. Thereby fluid flow from both of the chambers 6, 7 is prevented, and the rotating member 17 is consequently instantaneously locked in its immediate angular position.

Figure 7:
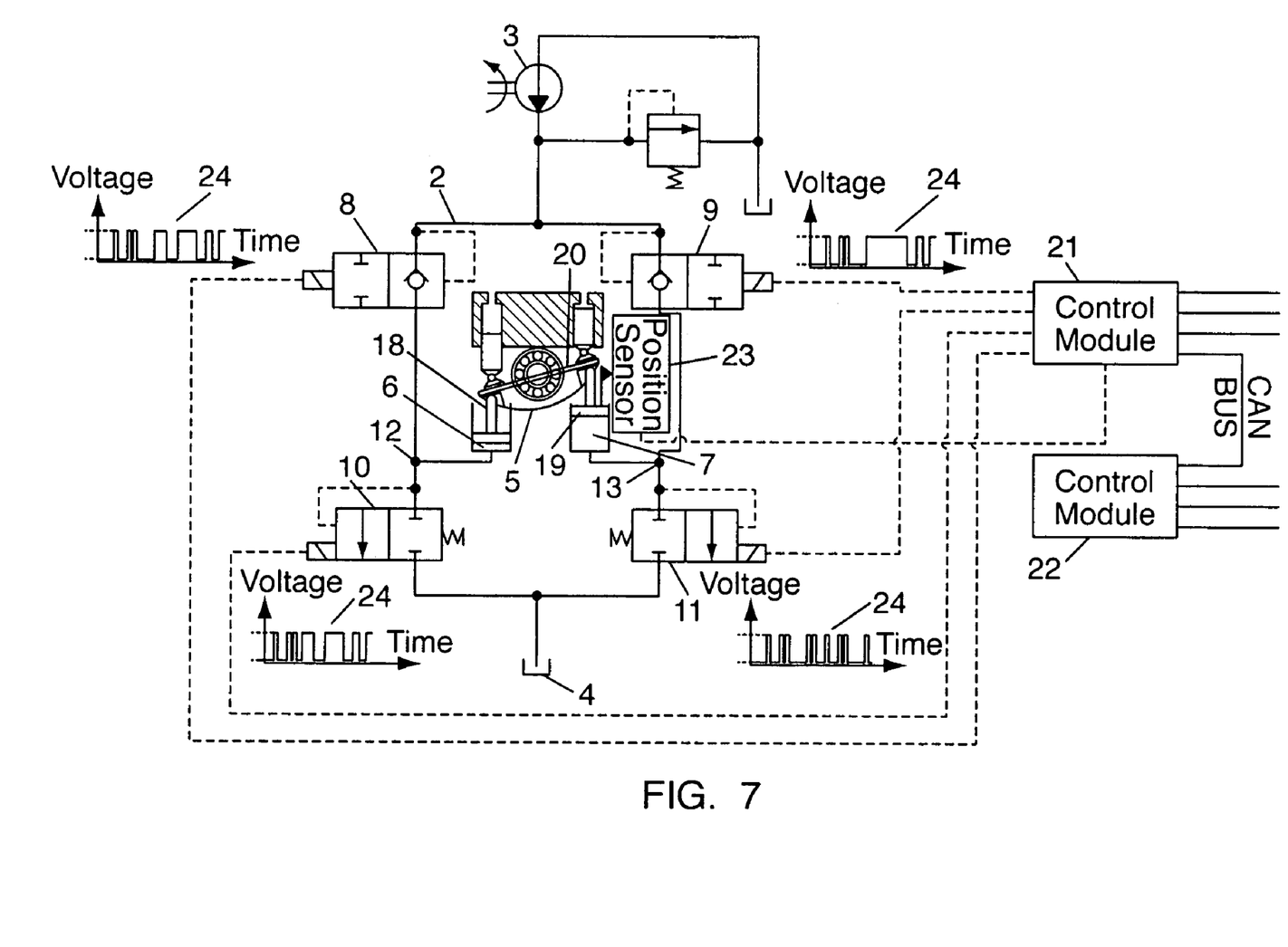

FIG. 7 is a schematic diagram of a hydraulic actuator according to a seventh embodiment of the invention. The hydraulic actuator of FIG. 7 is very similar to the hydraulic actuator of FIG. 1, and parts which have already been described above will therefore not be described in detail here.

The difference between the hydraulic actuator of FIG. 1 and the hydraulic actuator of FIG. 7 is that the servomotor 5 shown in FIG. 7 is of a kind having two linearly moving pistons 18, 19. Each of the linearly moving pistons 18, 19 has a chamber 6, 7, the chambers 6, 7 being fluidly connected to the valves 8, 9, 10, 11 as described above. The linearly moving pistons 18, 19 are attached to a swash plate 20 in such a manner that the angular position of the swash plate 20 is determined by the positions of the linearly moving pistons 18, 19. Thus, in this case, opening and closing the valves 8, 9, 10, 11 in an appropriate manner will result in a desired fluid flow to/from the chambers 6, 7. This will result in desired positions of the linearly moving pistons 18, 19, and thereby in a desired angular position of the swash plate 20.

In the case of a power cut off, the third valve 10 and the fourth valve 11 will close, thereby preventing flows of fluid from the chambers 6, 7 towards the tank 4, as described above. Furthermore, the first valve 8 and the second valve 9 will function as check valves, thereby preventing fluid flows from the chambers 6, 7 towards the pump 3, as described above. Thereby fluid flow from both of the chambers 6, 7 is prevented, and the swash plate 20 is consequently instantaneously locked in its immediate angular position.

FIG. 7 further illustrates how a main control module 21 and an extension control module 22 are connected to the servomotor 5. The hydraulic actuator comprises a sensor 23 measuring the position of one of the linearly moving pistons 19, and thereby the position of the swash plate 20. The measured position is supplied to the main control module 21, and based on this, the main control module 21 controls the valves 8, 9, 10, 11 by means of pulse train signals 24 supplied to each of the valves 8, 9, 10, 11. Thus, the valves 8, 9, 10, 11 shown in FIG. 7 are controlled by means of a closed loop control of the servomotor 5.

Figure 8:
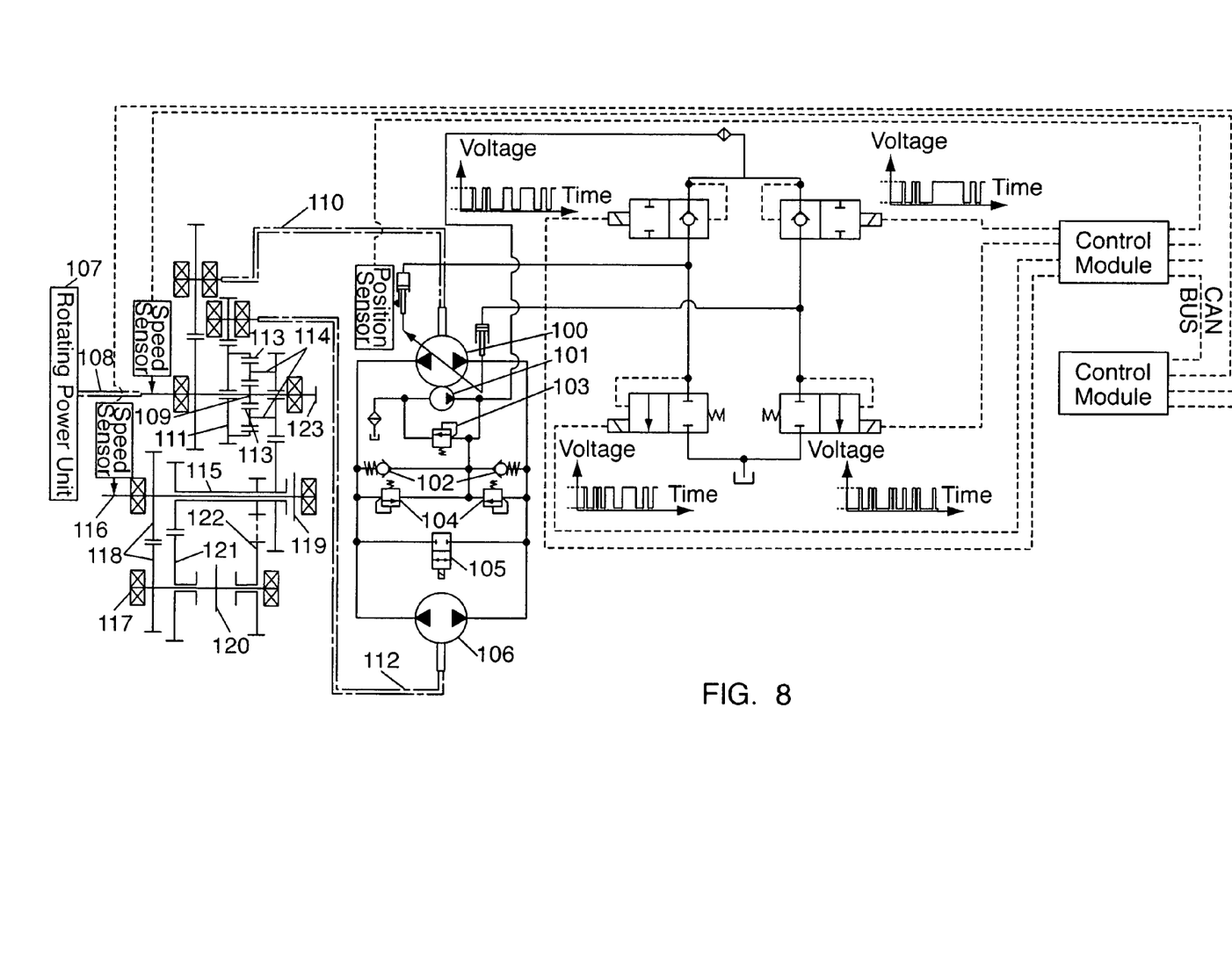
FIG. 8 is a schematic diagram illustrating use of a hydraulic actuator in a hydro-mechanical transmission (HMT).

FIG. 8 is a schematic diagram illustrating use of a hydraulic actuator in a hydro-mechanical transmission (HMT). The valve arrangement of the hydraulic actuator is identical to the one shown in FIG. 1, and it will therefore not be described here.

By metering flow into and out of the two chambers the displacement volume of a variable displacement unit 100 is varied. A charge pump 101 supplies the electro hydraulic actuator with fluid in addition to refilling two branches of the hydraulic main circuit through refill valves 102. A supply pressure relief valve 103 controls the pressure at the outlet of the charge pump 101. Pressure relief valves 104 protect the hydraulic main circuit against overpressure. By bypass valve 105 the two branches of the hydraulic main circuit may be partially or fully connected, thus bypassing a fixed displacement unit 106. For example, this gives the ability to rotate the fixed displacement unit 106 without the variable displacement unit 100 rotating, and visa versa. In the following description it is assumed that the bypass valve 105 is closed.

A rotating power unit 107, for example an internal combustion engine or an electrical motor, is driving an input shaft 108. The angular rotation speed of the input shaft 108 is the same as the angular rotation speed of sun gear 109, since they are connected. A gear drive from input 110 is connecting the input shaft 108 to the variable displacement unit 100. By varying the displacement volume of the variable displacement unit 100 the angular velocity of the fixed displacement unit 106 is varied. The fixed displacement unit 106 is connected to a ring gear 111 of an epicyclic gear train through gear drive to planetary gear 112. Consequently the angular velocity of the fixed displacement unit 106 and the angular velocity of the ring gear 111 are connected at a fixed ratio.

The relative angular velocities of the sun gear 109 and the ring gear 111 decide the angular velocities of the planet gears 113 and thus the angular velocity of the planet carrier 114. The planet carrier 114 drives a gear shaft 115 which is concentric with a first output shaft 116. The first output shaft 116 and a second output shaft 117 are linked through a first gear set 118 and their angular velocities are therefore at a fixed ratio. When all dog rings 119, 120 are disengaged the output shafts 116, 117 can rotate freely compared to the planet carrier 114. When engaging the first dog ring 119 with the gear shaft 115, the gear ratio from the planet carrier 114 to the output shafts 116, 117 is fixed at a first ratio. If engaging the first dog ring 119 with the bearing, the first output shaft 116 will be locked (vehicle park). If instead engaging the second dog ring 120 with a second gear set 121, the gear ratio from the planet carrier 114 to the output shafts 116, 117 is fixed at a second ratio. If instead engaging the second dog ring 120 with a third gear set 122, the gear ratio from the planet carrier 114 to the output shafts 116, 117 is fixed at a third ratio. In each of these gear ratios between the planet carrier 114 and the gear shaft 116, 117 infinitely many gear ratios between the input shaft 108 and the output shafts 116, 117 may be realized by controlling the angular velocity of the ring gear 111 through varying the displacement volume of the variable displacement unit 100. Hereby the gearing range is selected by operating either the first dog ring 119 or the second dog ring 120, while the specific gear ratio within the range is set by operating the variable displacement unit 100 using the electro hydraulic actuator. The specific displacement set-point for the variable displacement unit 100 is generated electronically in the control modules, in response to external sensor signals such as the two speed sensors, or any other sensor(s) connected to the control modules. As an alternative to the gear arrangement shown in FIG. 8, a gear arrangement of the kind disclosed in WO 2006/102906 could be used.

If the displacement volume of the variable displacement unit 100 is zero the ring gear 111 does not rotate, and the power flow is from the rotating power unit 107 to the output shafts 116, 117 through the mechanical gearing only. If the displacement volume of the variable displacement unit 100 is selected so the sun gear 109 and the ring gear 111 rotate in the same angular direction, the power flow going from the rotating power unit 107 to the output shafts 116, 117 is split between the mechanical gearing and the hydraulic main circuit. The fixed displacement unit 106 then works as a motor and the variable displacement unit 100 works as a pump. If the volume displacement of the variable displacement unit 100 is selected so the sun gear 109 and the ring gear 111 rotate in opposite angular directions, power is regenerated back to the input shaft 108 through the hydraulic main circuit. The fixed displacement unit 106 hereby works as a pump and the variable displacement unit 100 works as a motor.

An auxiliary pad 123 may be used as an additional power output, for example for mounting a hydraulic gear pump or mechanically driving a tool such as a snow blower, a snow blade, a plough, a tilt bucket, a herbicide sprayer etc.

While the present invention has been illustrated and described with respect to a particular embodiment thereof, it should be appreciated by those of ordinary skill in the art that various modifications to this invention may be made without departing from the spirit and scope of the present invention.

What is claimed is:

1. A hydraulic circuit comprising:
   at least one valve assembly forming a bridge circuit and being fluidly connectable between a fluid source and a fluid drain, the valve assembly comprising:
      at least one first valve fluidly connected between the fluid source and a first diagonal point of the bridge circuit, said at least one first valve being a valve which is normally open in a de-energized state, at least in a direction from the fluid source towards the first diagonal point,
      at least one second valve fluidly connected between the fluid source and a second diagonal point of the bridge circuit, said at least one second valve being a valve which is normally open in a de-energized state, at least in a direction from the fluid source towards the second diagonal point,
      at least one third valve fluidly connected between the first diagonal point of the bridge circuit and the fluid drain, said at least one third valve being a valve which is normally closed in a de-energized state, and
      at least one fourth valve fluidly connected between the second diagonal point of the bridge circuit and the fluid drain, said at least one fourth valve being a valve which is normally closed in a de-energized state, and
   a hydraulic servomotor having a first chamber fluidly connected to the first diagonal point and a second chamber fluidly connected to the second diagonal point such that the valve assembly controls flow in and out of the first and second chambers to move the hydraulic servomotor, wherein the valve assembly retains the position of the hydraulic servomotor in the event that a failure is detected.

2. The hydraulic circuit according to claim 1, wherein at least one of the valves is an electrically operable valve.

3. The hydraulic circuit according to claim 1, wherein the valves of the valve assembly are controlled by means of a closed loop control of the hydraulic servomotor.

4. The hydraulic circuit according to claim 3, further comprising at least one sensor, said sensor(s) being adapted to provide an input signal to the closed loop control.

5. The hydraulic circuit according to claim 1, wherein at least one of the valves of the valve assembly is driven by a pulse train signal.

6. Use of a hydraulic circuit according to claim 1 in a hydro-mechanical transmission (HMT).

7. The hydraulic circuit according to claim 1, further comprising at least one additional hydraulic servomotor fluidly connected between the first diagonal point and the second diagonal point.

8. The hydraulic circuit according to claim 1, wherein the at least one valve assembly is arranged in a modular configuration.

9. The hydraulic circuit according to claim 1, wherein the at least one valve assembly is arranged with a number of identical valve assemblies in such a manner that redundant control of the hydraulic servomotor is obtained.

10. A hydraulic circuit comprising:
    at least one valve assembly forming a bridge circuit and being fluidly connected between a fluid source and a fluid drain, the valve assembly comprising:
       at least one first valve fluidly connected between the fluid source and a first diagonal point of the bridge circuit, said at least one first valve being a valve which is normally open in a de-energized state, at least in a direction from the fluid source towards the first diagonal point, at least one second valve fluidly connected between the fluid source and a second diagonal point of the bridge circuit, said at least one second valve being a valve which is normally open in a de-energized state, at least in a direction from the fluid source towards the second diagonal point, at least one third valve fluidly connected between the first diagonal point of the bridge circuit and the fluid drain, said at least one third valve being a valve which is normally closed in a de-energized state, and at least one fourth valve fluidly connected between the second diagonal point of the bridge circuit and the fluid drain, said at least one fourth valve being a valve which is normally closed in a de-energized state, and a variable displacement unit having a first chamber fluidly connected to the first diagonal point and a second chamber fluidly connected to the second diagonal point such that the valve assembly controls flow in and out of the first and second chambers to vary the displacement volume of the variable displacement unit, wherein the valve assembly retains the position of the variable displacement unit in the event that a failure is detected.

11. The hydraulic circuit according to claim 10, wherein the at least one valve assembly is arranged in a modular configuration.

12. Use of a hydraulic circuit according to claim 10 in a hydro-mechanical transmission (HMT).

13. A hydraulic circuit comprising:

at least one valve assembly forming a bridge circuit and being fluidly connectable between a fluid source and a fluid drain, the valve assembly comprising:

at least one first valve fluidly connected between the fluid source and a first diagonal point of the bridge circuit, said at least one first valve being a valve which is normally open in a de-energized state, at least in a direction from the fluid source towards the first diagonal point, at least one second valve fluidly connected between the fluid source and a second diagonal point of the bridge circuit, said at least one second valve being a valve which is normally open in a de-energized state, at least in a direction from the fluid source towards the second diagonal point, at least one third valve fluidly connected between the first diagonal point of the bridge circuit and the fluid drain, said at least one third valve being a valve which is normally closed in a de-energized state, and at least one fourth valve fluidly connected between the second diagonal point of the bridge circuit and the fluid drain, said at least one fourth valve being a valve which is normally closed in a de-energized state, a variable displacement unit, fluidly arranged in a hydraulic main line, having a first chamber fluidly connected to the first diagonal point and a second chamber fluidly connected to the second diagonal point such that the valve assembly controls flow in and out of the first and second chambers to vary the displacement volume of the variable displacement unit, and a fixed displacement unit in fluid communication with the variable displacement unit through a hydraulic main line, wherein the valve assembly retains the position of the variable displacement unit in the event that a failure is detected.

* * * * *